United States Patent [19]
Abdo

[11] 3,839,798
[45] Oct. 8, 1974

[54] FISHING LINE FOOTAGE COUNTER

[76] Inventor: Ollie Abdo, Rt. 3 Box 1041, Bend, Oreg. 97701

[22] Filed: Mar. 12, 1973

[21] Appl. No.: 339,643

[52] U.S. Cl............................................. 33/134 R
[51] Int. Cl........................... G01b 3/12, G01b 5/04
[58] Field of Search .. 33/129, 134 R, 141 R, 141 B; 242/84.1 F, 84.1 M, 84.1 N

[56] References Cited
UNITED STATES PATENTS

| | | | |
|---|---|---|---|
| 1,270,149 | 6/1918 | Groce | 33/129 X |
| 2,233,530 | 3/1941 | Holman | 33/134 R |
| 2,500,026 | 3/1950 | Erickson | 33/129 |
| 2,500,026 | 3/1950 | Erickson | 33/129 |
| 2,576,629 | 11/1951 | Morby | 33/129 |
| 2,613,044 | 10/1952 | Zetts | 242/84.1 F X |
| 2,637,112 | 6/1953 | La Fontaine et al. | 33/129 |
| 2,718,376 | 9/1955 | Raney | 33/129 |
| 2,874,477 | 2/1959 | McConnell | 33/129 |
| 3,159,920 | 12/1964 | Garrett | 33/129 |

FOREIGN PATENTS OR APPLICATIONS 83,906   7/1921   Austria

*Primary Examiner*—Louis R. Prince
*Assistant Examiner*—Charles E. Phillips
*Attorney, Agent, or Firm*—Eugene M. Eckelman

[57] ABSTRACT

A device adapted to be mounted on a fishing pole having a pair of rollers between which the fishing line passes. One of the rollers operates a counter for indicating the amount of line that has been let out. The other roller is adjustably mounted with relation to the first roller to accommodate lines of different sizes and to vary the pressure of the rollers on the line. The adjustable mounting of the second roller includes a slidable carrier in a housing controlled in a setting by an adjusting screw moving such block against spring pressure.

1 Claim, 4 Drawing Figures

PATENTED OCT 8 1974　　　　　　　　　　　　　　　3,839,798

3,839,798

FISHING LINE FOOTAGE COUNTER

BACKGROUND OF THE INVENTION

This invention relates to new and useful improvements in fishing line footage counters.

It is often desirable for a fisherman to know the amount of line that he has let out in order to reach the same area of fishing if desired. It is particularly desirable that such a mechanism be combined with a fishing pole so that a fisherman can control the outflow of the line. Devices have heretofore been proposed for measuring line let out from the fishing pole but such devices have not allowed the free stripping of the line through the counter which is necessary. For example, U.S. Pat. No. 3,136,066 provides a line measuring device for fishing poles but such a device would not operate satisfactorily, particularly with a spinning type reel, since the line is wrapped one turn around a drum of the counter and would not be free stripping. In the structure of U.S. Pat. No. 3,159,920, the line also is wrapped once or twice around the drum of the counter. Other prior structures use means that do not allow the free stripping and line engagement necessary.

SUMMARY OF THE INVENTION

According to the present invention and forming a primary objective thereof, a fishing line footage counter is provided which has novel structure facilitating accurate measuring of the line being stripped from the reel and also allowing free stripping so that the structure can be used in combination with a spinning type reel.

A more particular object of the present invention is to provide a counter of the type described which is arranged to be mounted on a fishing pole and which employs first and second rollers one of which is driven by the fishing line and operating a counter, the arrangement being such as to allow normal operation of a spinning reel and also to accurately measure the footage of line let out.

Another object is to provide a fishing line footage counter as described having a novel arrangement wherein the second roller is adjustable toward and away from the first roller so as to accommodate lines of different diameters and also to apply the desired pressure on the line for proper operation.

The invention will be better understood and additional objects and advantages will become apparent from the following description taken in connection with the accompanying drawings which illustrate a preferred embodiment.

DETAILED DESCRIPTION OF A PREFERRED EMBODIMENT

Figure 1:
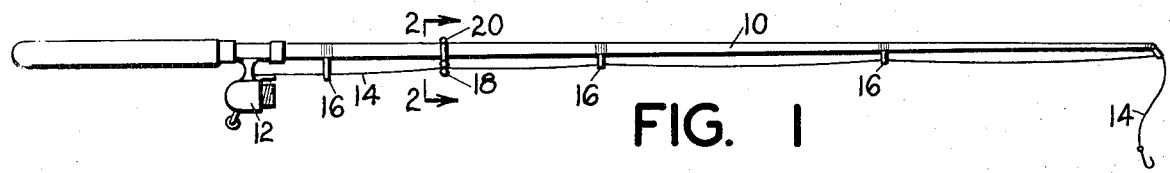
FIG. 1 is a side elevational view of a fishing pole showing the present counter installed thereon.

With particular reference to FIG. 1, the numeral 10 designates a fishing pole and the numeral 12 designates a spinning type reel, these members being of conventional construction. The line 14 from the reel passes through guides 16 on the pole.

Figure 2:
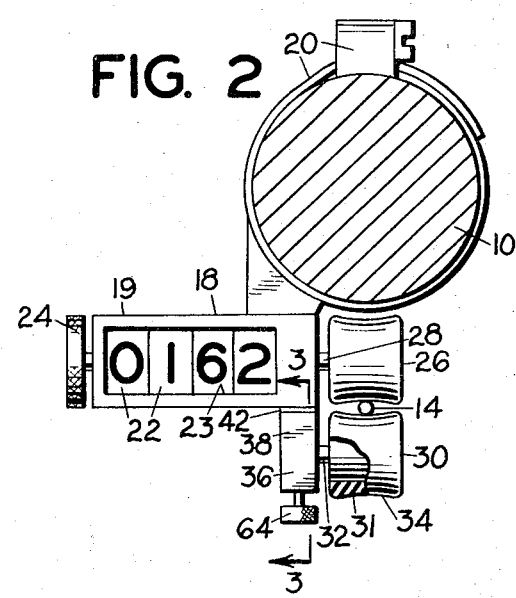
FIG. 2 is an enlarged cross sectional view taken on the line 2—2 of FIG. 1.

The present counter mechanism is designated generally by the numeral 18 and comprises a housing 19, FIG. 2, having a clamp 20 integrated therewith by means of which the housing can be mounted securely on a fishing pole. Housing 19 encloses a counter mechanism 22 having a suitable number of digit wheels viewable through a window 23. The counter mechanism is of conventional construction and thus is not detailed structurally. It has a reset button 24 which is also of conventional construction and operation wherein the counter can be set back to zero merely by pressing the button.

The counter is driven by a first roller 26 keyed or otherwise secured on a shaft 28 which extends from the counter mechanism 22. This shaft projects laterally from the counter housing 22 and is adapted to support the roller 26 adjacent to the fishing pole. Associated with the first roller 26 is a second roller 30 keyed or otherwise secured on a shaft 32. The two rollers 26 and 30 have a friction type surface 31, such as rubber or plastic, and the surface of each roller is concaved as seen in FIG. 2 for confining the line therebetween.

Figure 3:
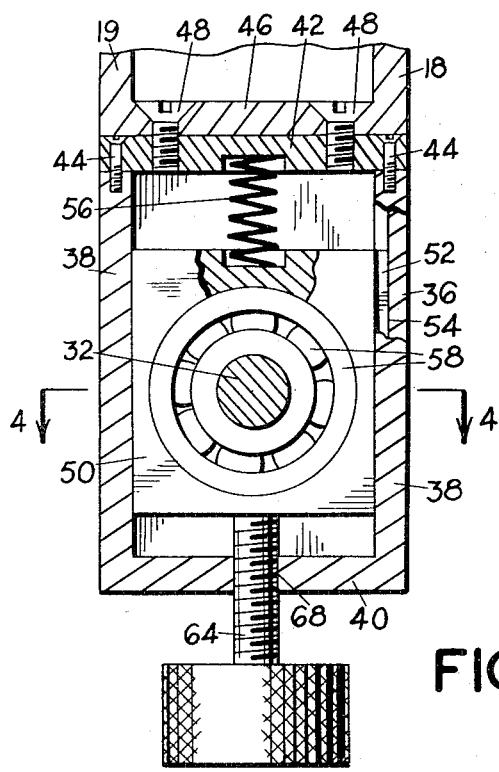
FIG. 3 is an enlarged sectional view taken on the line 3—3 of FIG. 2.
Figure 4:
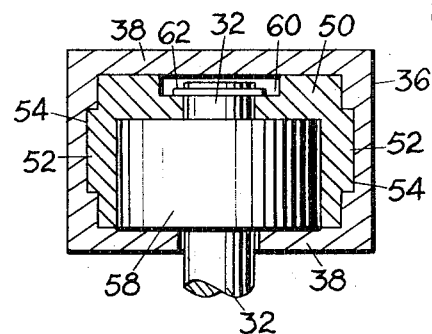
FIG. 4 is a sectional view taken on the line 4—4 of FIG. 3.

Shaft 32 for the second roller extends from an auxiliary housing portion 36, FIGS. 2–4, secured to housing 19 in depending relation. Housing 36 has defining side walls 38, a bottom wall 40, and a top wall 42. The top wall 42 is removably secured to the housing 36, as by screws 44, and is removably connected to housing 19, as by screws 48, for purposes of assembly and maintenance.

A bearing carrier 50 is slidably mounted for vertical movement in housing 36, and for guided movement of such carrier it has side ribs 52, FIGS. 3 and 4, which travel in side grooves 54 in the housing. The carrier 50 is urged downwardly by a compression spring 56 which abuts between the top of said carrier and the top wall 42 of the housing 36. Shaft 32 is supported in a ball bearing 58 in the carrier 50, and such bearing provides a substantially free rotation of the shaft 32 to reduce friction of rotation to a minimum. The end of the shaft 32 opposite from the roller extends into a recess 60, FIG. 4, in which a keeper 62 engages the shaft for removably maintaining the latter in place.

The lower end of carrier 50 abuts against the upper end of an adjusting screw 64 threadedly engageable with a tapped bore 68 in the bottom wall of the housing. The carrier has free abutting engagement with the end of the adjusting screw to allow rotation of the latter for adjustment.

The carrier 50, being urged downwardly by the spring 56, is maintained in the desired vertical position by selected settings of the adjusting screw. Such location of the carrier is determined by the desired setting of roller 30 for proper positioning with relation to the other roller 26. This adjustment is in turn determined by the diameter of the fishing line being used and also by the desired or necessary grip on the line whereby to provide accurate counting and free stripping As stated, the present device allows normal operation of a reel, even a spinning type reel. This is due to the free stripping function of the line through the counter and also due to the two rollers being disposed so that the area between the rollers in which the line passes is substantially aligned with the normal position of the line. The line therefore has substantially striaght line movement. Preferably, the counter is mounted on the pole intermediate the first and second eyes 16 from the reel.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A fishing line footage counter for a fish pole having a reel mounted thereon for fishing line and also having spaced guides through which the line passes, comprising a. a housing having opposite sides,
   b. clamp means on said housing arranged to mount it on a fish pole,
   c. counter means in said housing having a shaft projecting through one side of said housing,
   d. a first friction surfaced roller secured on the projecting end of said shaft,
   e. a carrier member slidably mounted in said housing for movement toward and away from said first roller,
   f. a shaft on said carrier member projecting through said one side of said housing parallel with said shaft for said first roller,
   g. a second friction surfaced roller secured on the shaft projecting from said carrier member in edge relation with said first roller and arranged to have friction engagement with a fish line between it and said first roller,
   h. spring means urging said carrier member away from said first roller,
   i. and an adjusting screw threadedly mounted in said housing and engageable with said carrier for adjustably positioning the latter to vary the spacing between said rollers to accommodate different diameter lines and to adjust the frictional grip to be applied to the line,
   j. said clamp means and said housing being arranged such that when mounted on a fishing pole the area between said rollers is aligned with the normal axis alignment of the fish line in the guides on the fish pole.

* * * * *